Sept. 11, 1956     D. A. CONIGLIO     2,762,630
AUTOMATIC CHUCK

Filed Feb. 4, 1954                                               2 Sheets—Sheet 1

INVENTOR
DONALD A. CONIGLIO

Fred N. Schwend
ATTORNEY

Sept. 11, 1956     D. A. CONIGLIO     2,762,630
AUTOMATIC CHUCK
Filed Feb. 4, 1954     2 Sheets-Sheet 2
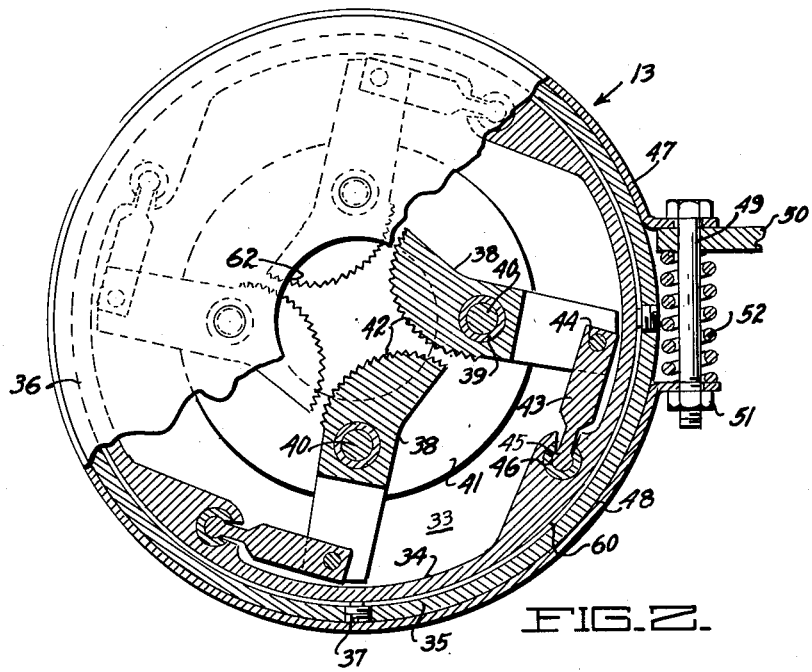
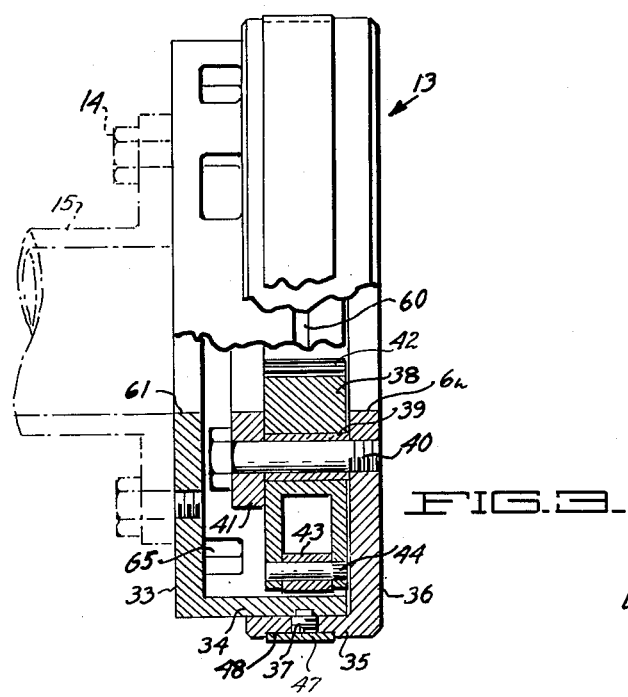
INVENTOR
DONALD A. CONIGLIO
ATTORNEY

United States Patent Office 2,762,630
Patented Sept. 11, 1956

2,762,630

AUTOMATIC CHUCK

Donald A. Coniglio, Temple City, Calif.

Application February 4, 1954, Serial No. 408,259

5 Claims. (Cl. 279—106)

This invention relates to chucks for gripping and turning rods, pipes, etc., for the purpose of cutting, threading or otherwise operating on the same.

A principal object of the present invention is to provide a simple chuck of the above type which will automatically grip and center a workpiece during rotation in one direction and release the workpiece during rotation in the opposite direction.

Another object is to provide an automatically opening and closing chuck which may be readily attached to many different types of existing pipe threading machines, lathes, etc.

Another object is to provide an automatically operable chuck in which the gripping pressure exerted by the jaws is substantially the same for all diameters of workpieces within the range of the chuck.

Another object is to provide a chuck of the above type which is simple and economical to manufacture and is of minimum weight.

Another object is to provide a chuck of the above type which embodies a frictional drag which may be adjusted while the chuck is in operation.

The manner in which the above and other objects are accomplished will be readily understood on reference to the following specification when read in conjunction with the accompanying drawings wherein:

Fig. 2 is a front view of the chuck, partly in section, and taken in the direction of the arrow 2 in Fig. 1.

Fig. 3 is a side view of the chuck, also partly in section.

Figure 1:
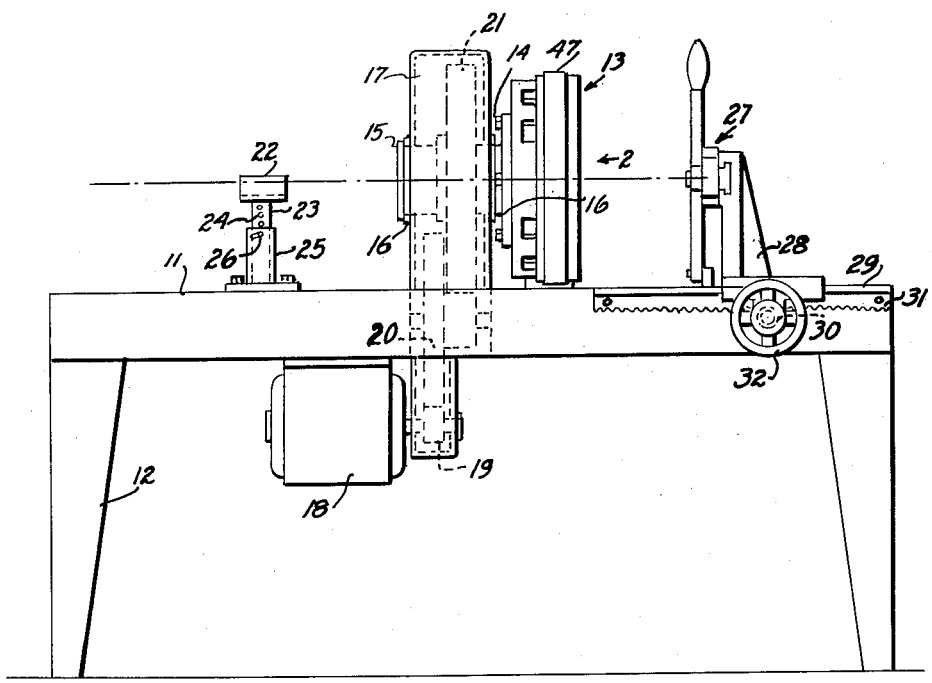
Fig. 1 is a front view of a pipe threading machine embodying a preferred form of my present invention.

Referring to the drawings, the pipe threading machine comprises a suitable horizontally extending frame 11 suitably secured to upstanding legs 12.

According to the present invention, a chuck, generally indicated at 13, is provided for supporting and rotating a pipe or rod to be threaded or otherwise worked on.

The chuck is secured by bolts 14 to a hollow flanged spindle 15 rotatably mounted in bearings 16 formed in a housing 17 supported by the frame 11. The spindle is driven by a reversible electric motor 18 secured to the underside of the frame 11. The motor is entrained with the spindle through a series of gears comprising a pinion 19 meshing with the larger gear of a compound gear 20. The latter is rotatably mounted in bearings supported by the frame 11, and the smaller gear of the compound gear 20 meshes with a large gear 21 fixed on the spindle.

The chuck 13 is effective to support one end only of a pipe or rod to be worked on, and in order to support the other end, a trough-like guide 22 is provided. The latter is adjustable in height to accommodate pipes or other workpieces of different diameters and for this purpose it has a vertical post 23 with a series of spaced holes 24 therein. The post is slidable vertically in a hollow standard 25 supported by the frame 11. A pin 26 is passed through an opening in the standard 25 and through a selected one of the holes 24 to maintain the guide 22 in adjusted position.

The pipe or the like, after being inserted in the chuck 13 and rested in the guide 22 is moved to a position wherein the right-hand end thereof is located adjacent a suitable tool 27 which for the purpose of the present disclosure may be considered a threading tool. The details of this tool are immaterial to the present invention and for the purpose of brevity are omitted herein.

The tool 27 is mounted on a carriage 28 slidable longitudinally of the machine along ways 29 on the frame 11. The carriage 28 is movable along the ways 29 by a pinion 30 rotatably mounted thereon and enmeshed with a stationary gear rack 31 suitably secured to the frame 11. A handwheel 32 is provided for rotating the pinion to advance the carriage.

The chuck 13 comprises an open-ended drum 33 removably attached to the spindle 15 by the aforementioned bolts 14. The annular flange 34 of the drum forms a bearing for rotatably supporting the annular flange 35 of a second open-ended drum 36.

In order to prevent relative longitudinal movement of the drums while permitting relative rotation thereof, a circumferential groove 60 is formed on the outer periphery of the flange 34 to receive the reduced shanks of a series of set screws 37 threaded in the flange 35 of the second drum.

A series of four jaws 38 are located within the nested drums and each is rotatably mounted on a bearing sleeve 39 fitted over a bolt 40. The latter bolts extend through an annular ring 41 and are threaded into the wall of the drum 36, thus forming pivotal supports for the jaws.

The inner ends of jaws 38 are so curved and serrated at 42 as to grip and center pipes, etc., of different diameters, the latter being passed through the hollow spindle 15 and through coaxial openings 61 and 62 in the walls of drums 33 and 36, respectively.

The outer end of each jaw 38 is bifurcated to straddle a link 43, being pivoted to one end thereof by a pin 44. Each link 43 is pivoted at the opposite end thereof to the drum 33. For this purpose the link has a cylindrical bearing formation 45 fitted in a slotted socket or bearing tube 46 secured in the wall of the flange 34 of drum 33. It will be noted that the links have their lengths extending substantially tangentially of a circle extending coaxially of the axes of rotation of the drums 33 and 36.

Means are provided to exert a frictional drag on the drum 36 to cause a relative rotation between the drums when drum 33 is rotated by the motor, for the purpose of "opening" and "closing" the jaws 38. To provide such a drag, a brake band 47 of flexible metal encircles the flange 35 of drum 36, resting in a circumferential groove 48 formed therein. One end of the brake band is secured by the head of a bolt 49 to a bracket 50 rigidly mounted on the machine frame 11 in a manner not shown. The other end of the brake band has a hole therein fitted over the shank of bolt 49 and retained thereon by a nut 51. By adjusting the nut, the amount of frictional drag exerted by the brake band may be increased or decreased as desired. A compression spring 52 is extended between the bracket 50 and lower end of the brake band to retain the latter against the nut 51.

When it is desired to grip and center a workpiece in the machine preparatory to threading or otherwise operating on the same, the workpiece is passed through the chuck and the motor operated to drive the spindle 15 and drum 33 in a counterclockwise direction (as viewed in Fig. 2). Accordingly, the drum 33 will advance, causing the links 43 to swing the jaws 38 counterclockwise about the bearing sleeves 39 which are yieldably held in their illustrated positions by virtue of the frictional drag imposed on the drum 36 by the brake band 47. Thus, the jaws will first center and then grip the workpiece by an amount depending on the amount of drag. Thereafter, the brake band 47 will slip but the incident drag created thereby will continue to effect a gripping action by the jaws 38.

When it is desired to release the workpiece, the motor is reversed, causing the drum 33 to rotate in a clockwise direction relative to the drum 36 to rock the jaws 38 clockwise about their pivots.

A series of openings 65 is formed in the flange 34 of drum 33 to permit cutting or lubricating fluid to pass out of the chuck. It will be noted that such fluid will flow along the outer periphery of the flange 34 and thus lubricate the bearing surfaces formed by flanges 34 and 35. Also, such fluid will flow around the periphery of the flange 35 to lubricate the brake band 47.

Although I have described my invention in detail and have therefore used certain terms and languages herein, it is to be understood that the present disclosure is illustrative rather than restrictive, particularly in regard to the type of machine to which it is applied, and that changes and modifications may be made without departing from the spirit or scope of the invention as set forth in the claims appended hereto. For example, the chuck may be attached to other machines having different sizes or shapes of spindles by providing suitable adaptors which may be interposed between the drum 33 and the spindle.

Having thus described my invention, what I desire to secure by United States Letters Patent is:

1. A chuck for turning a workpiece comprising two relatively rotatable elements having coaxially arranged openings therein to receive a workpiece, a plurality of gripping jaws pivotally supported on one of said elements for movement toward and away from said workpiece, a link pivotally connected between each of said jaws and the other of said elements, said links having their lengths extending at least substantially tangentially of a circle located coaxially of the axes of rotation of said elements, and means other than said jaws for effecting relative rotation between said elements.

2. A chuck for turning a workpiece comprising two relatively rotatable elements having coaxially arranged openings therein to receive a workpiece, a plurality of gripping jaws pivotally supported on one of said elements for movement toward and away from said workpiece, a link pivotally connected between each of said jaws and the other of said elements, said links having their lengths extending at least substantially tangentially of a circle located coaxially of the axes of rotation of said elements, means for rotating one of said elements, and means for applying a continuous drag to the other of said elements.

3. A chuck for turning a workpiece comprising two relatively rotatable elements having coaxially arranged openings therein to receive a workpiece, a plurality of gripping jaws, means pivotally supporting said jaws on one of said elements for movement toward and away from engagement with said workpiece, links for operating said jaws, each of said links being pivotally connected between the other of said elements and a point on its respective jaw located on the side of said supporting means remote from the workpiece engaging portion thereof, and said links having their lengths extending at least substantially tangentially of a circle located coaxially of the axes of rotation of said elements, means other than said jaws for causing relative rotation of said elements.

4. A chuck for turning a workpiece comprising two relatively rotatable open-ended drum elements having coaxially arranged openings therein to receive a workpiece, a plurality of gripping jaws located within said drum elements, means pivotally supporting said jaws on one of said elements for movement toward and away from engagement with said workpiece, links for operating said jaws, each of said links being pivotally connected between the other of said elements and a point on its respective jaw located on the side of said supporting means remote from the workpiece engaging portion thereof, said links having their lengths extending at least substantially tangentially of a circle located coaxially of the axes of rotation of said elements, means for rotating one of said elements, and means for applying a continuous drag to the other of said elements.

5. A chuck for turning a workpiece comprising a pair of drum elements having coaxially extending openings therein to receive said workpiece, each of said drum elements having an annular flange integral therewith, one of said drums having its said flange rotatable within the flange of the other of said drums, a plurality of gripping jaws located within said drum elements, means pivotally supporting said jaws on said other drum, links for operating said jaws, each of said links being pivotally connected between said first-mentioned drum element and a point on its respective jaw located on the side of said supporting means remote from the workpiece engaging portion thereof, said links having their lengths extending at least substantially tangentially of a circle located coaxially of the axes of rotation of said drum elements, and means for applying a continuous drag to said other drum.

References Cited in the file of this patent

UNITED STATES PATENTS

| | | |
|---|---|---|
| 1,095,304 | Weiss | May 5, 1914 |
| 2,207,621 | Hite | July 9, 1940 |
| 2,394,861 | LeTourneau | Feb. 12, 1946 |
| 2,474,633 | Marshall | June 28, 1949 |
| 2,479,560 | Eaton | Aug. 23, 1949 |
| 2,560,798 | Jensen | July 17, 1951 |
| 2,578,245 | Heaton | Dec. 11, 1951 |